METHOD OF FORMING A GLASS FILM ON AN OBJECT

Filed March 22, 1962

INVENTORS
WILLIAM A. PLISKIN
ERNEST E. CONRAD
BY Everett A. Gartsell
ATTORNEY

United States Patent Office 3,212,929

Patented Oct. 19, 1965

3,212,929

METHOD OF FORMING A GLASS FILM ON AN OBJECT

William A. Pliskin and Ernest E. Conrad, Poughkeepsie, N.Y., assignors to International Business Machines Corporation, New York, N.Y., a corporation of New York Filed Mar. 22, 1962, Ser. No. 181,743
9 Claims. (Cl. 117—201)

This invention is directed to the method of forming a glass film on an object and, more particularly, to the method of producing on a surface of that object a hole-free glass film which has a very uniform thickness that may be in the range of about 0.5–15 microns.

The present invention represents an improvement over the method disclosed and claimed in applicants' copending application Serial No. 141,668 filed September 29, 1961, entitled "Method of Forming a Glass Film on an Object and the Product Produced Thereby," and assigned to the same assignee as the present invention.

In the manufacture of various electrical components such as resistors, capacitors and semiconductor devices, it is often desirable to provide them with a tightly adherent protective jacket which serves as a hermetic seal that prevents the contamination of the components by noxious materials which may impair the electrical characteristics of the device or may physically damage them so as to render them unsatisfactory or worthless. A wide variety of coating materials such as plastic and glass have been employed with some success. In general thick protective jackets of these materials have been used and have proved to be satisfactory for some applications. However, the present trend in the electronic and computer fields is toward the miniaturization of semiconductor or solid-state components. Thick protective coatings undesirably increase the bulk of such components and often such jackets are subject to cracking during required operation over a range of operating temperatures. Attempts to produce thin uniform hole-free adherent films on such components have not always met with significant success. While the techniques of applicants' above-identified application have been remarkably successful, they have not permitted the use of fluids having as wide a range of dielectric constants as may be desired, particularly those materials having dielectric constants greater than 20.7. Also in some instances it may be desirable to reduce the over-all variation in the thickness of the film from about 1 micron to about 0.2 micron.

It is an object of the invention, therefore, to produce a new and improved method of applying to an object a hole-free glass film that has a uniform thickness.

It is another object of the invention to provide a new and improved method of forming on an object a holefree glass film which may have a very uniform thickness in the range of a fraction of a micron to about 15 microns.

It is a further object of the invention to provide a new and improved method of forming on an object an adherent hole-free glass film having a thermal coefficient of linear expansion which does not necessarily substantially match that of the object.

It is an additional object of the invention to provide a new and improved method of forming on an object an adherent hole-free glass film having a thickness in the range of a fraction of a micron to several microns while maintaining a small variation in that thickness which may be as low as about 0.2 micron.

In accordance with a particular form of the invention, the method of forming a glass film on a surface of an object comprises covering that object with a first fluid having a dielectric constant less than 9, and covering that first fluid with a second fluid having a dielectric constant in the range of 6–33.6, a density less than that of the first fluid, and containing a suspension of finely divided glass particles. The method further comprises centrifuging that object and the fluids to deposit the particles on the aforesaid surface of the object, separating the object from the fluids, and heating the object at at least the softening temperature of the glass particles for a time sufficient to fuse the particles and produce a thin uniform hole-free glass film on the aforesaid surface.

The foregoing and other objects, features and advantages of the invention will be apparent from the following more particular description of a preferred embodiment of the invention, as illustrated in the accompanying drawing.

Figure 1:
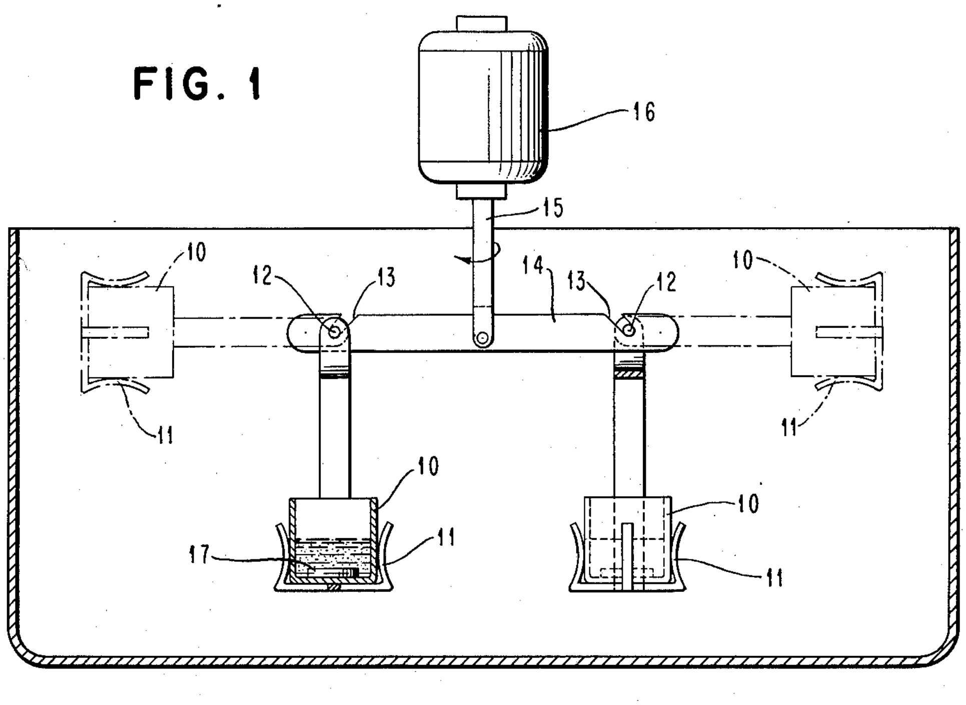
FIG. 1 is a diagrammatic representation of a centrifuging apparatus employed in forming a glass film on a surface of an object.

In practicing the present invention, a suitable glass is comminuted in a convenient manner as by ball milling to form a powdered glass. Many different types of glasses are suitable for use in accordance with the method of the present invention. The type of glass selected may depend upon the particular application at hand. For example, the object to receive a thin hole-free glass film of uniform thickness may require a chemical resistant glass such as a borosilicate-type glass for protective purposes and for withstanding high operating temperatures. Also, the object may be a device such as a transistor which will operate over a wide range of temperatures which may dictate that, for protective purposes, the coefficient of thermal expansion of the semiconductor material of the device and that of the glass film be substantially equal so as to minimize stresses which might otherwise crack the glass during temperature cycling. For example, silicon has a coefficient of expansion per degree centigrade of $32\times10^{-7}$ which is closely matched by that of a borosilicate glass available to the trade as Corning 7740 or Pyrex and having a coefficient of expansion of $32.6\times10^{-7}$. The ball-milling operation produces small particles of glass of varying size. The powdered glass from the ball-milling procedure may then be introduced and dispersed into a suitable fluid suspending medium. An organic fluid such as methyl alcohol is one of many which are satisfactory for this purpose. Other appropriate fluids are ethyl alcohol, isopropyl alcohol, acetone and water. Ultrasonic agitation is particularly useful in dispersing particles in the suspending medium.

Next it is now desirable to remove the larger glass particles from the suspension since they are ordinarily too large for use in subsequent filming operations. This may be accomplished with a centrifuging apparatus such as that represented diagrammatically in FIG. 1. To that end, the suspension of glass particles is placed in two containers 10, 10 which are mounted in carriers 11, 11 that are supported by trunnions 12, 12 in slots 13, 13 in a transverse member 14 that is mounted in a horizontal plane at the end of a drive shaft 15 of a variable speed motor 16. Rotation of the motor for a few minutes at a relatively low speed develops a centrifugal force of from about 15–500 times the force of gravity *g* which swings the carriers 11, 11 and their containers 10, 10 to the broken-line positions represented in FIG. 1 and separates out the larger glass particles in the suspension by depositing them on the bottoms of the containers. When the machine comes to rest, the containers 10, 10 may be removed and the suspension decanted leaving behind the undesirable larger particles. The suspension is then placed in other containers and again centrifuged at a higher speed to develop say 2000 g. to separate out the desired finely divided glass particles. It will be appreciated that these speeds of rotation may be varied from that indicated depending upon the particle size separations which are desired. The last-mentioned suspending fluid is decanted leaving the desired finely divided glass particles. The suspension which had been decanted in this last step contains extra fine glass particles which are not always desirable in subsequent operations and may contain unwanted impurities that were picked up the ball-milling operation.

The desired glass particles are removed from their containers and may be dried on a hot plate to which mild heat is applied or they may be dried in a desiccator at room temperature. Then a suspension is made by ultrasonically mixing the dried glass particles in a fluid suspending medium. 0.02–0.1 gram of the glass particles in 100 cc. of the suspending medium has proved to be a useful concentration although other concentrations may be employed. The glass particles are probably irregular in shape and may have a selected mean particle size in the range of 0.02–2 microns. Better results may be obtained by using the smaller particle sizes. A selected means particle size in the range of 0.1–0.7 micron has been employed with particular success in forming glass films having uniform thicknesses in the range of 0.5–15 microns on substrates of semiconductor and insulating material.

In accordance with the invention, the suspending medium employed with the desired size of glass particles is a fluid having a dielectric constant in the range of 6–33.6. Fluids having a dielectric constant of about 10 have produced excellent results. Various suspending media which have proved satisfactory are methyl acetate, ethyl acetate, isoamyl acetate, tertiary butyl alcohol mixed with a slight amount of secondary butyl alcohol to maintain the former fluid at room temperature, isopropyl alcohol, acetone, methyl ethyl ketone, ethyl alcohol and methyl alcohol. Various mixtures of the recited fluids and other organic esters, and also mixtures of those fluids with low dielectric constant fluids such as various hydrocarbon or halogenated hydrocarbons as benzene, hexane and trichloroethylene may be employed. A few examples of appropriate such mixtures are 15 cc. of methyl alcohol, and 85 cc. of ethyl acetate producing a dielectric constant of about 10. 30 cc. of isopropyl alcohol and 70 cc. of ethyl acetate producing a dielectric constant of 9.7 have also given excellent results. A mixture of 9 cc. of isopropyl alcohol and 91 cc. of isoamyl acetate producing a dielectric constant of 6 has been satisfactory. A mixture of 5–20 parts by volume of methyl alcohol and 95–80 parts of ethyl acetate has proved to be desirable. Also single-component suspending media for the glass particles which have given good results are ispropyl alcohol with a dielectric constant of 18.3 at 25° C., acetone with its dielectric constant 20.7, ethyl alcohol with its dielectric constant of 24.3, and methyl alcohol with its dielectric constant of about 32.6. Materials such as methyl alcohol, isopropyl alcohol and acetone have higher dielectric constants than fluids such as the organic esters, ethyl acetate and amyl acetate or a pure hydrocarbon such as n-hexane and have afforded fine results. The use of a high dielectric constant fluid, which is miscible in a low dielectric constant fluid, as the suspending medium for the glass particles is advantageous. The dry glass particles are first ultrasonically mixed with the higher dielectric constant fluid. Any agglomerates which are already present in the dry particles will have a greater tendency to break up and go into suspension. It is believed that the colloidal particles of glass acquire a high electric charge in the higher dielectric constant medium, repel each other more, and thus tend to form a better colloidal suspension. When the lower dielectric constant fluid is added to the suspension just described, the particles still remain in suspension. When the glass particles are suspended first in methyl or isopropyl alcohol as explained above, excellent films are obtained. The alcohol also removes water which may be physically absorbed on the glass particles. Another fluid mixture which has afforded good results is one containing 95% tertiary butyl alcohol and 5% secondary butyl alcohol. The important component in this mixture is the tertiary butyl alcohol, the secondary butyl alcohol being used to keep the former in a liquid state since its freezing point is 26° C.

Figure 2:
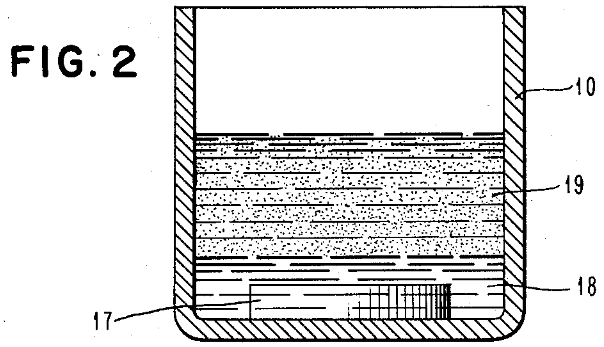
FIG. 2 is a sectional view of a container and its contents during a step in the formation of that film.
Figure 3A:
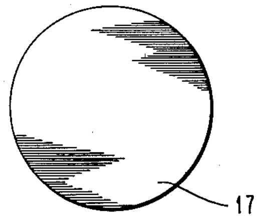
FIGS. 3*a*, 3*b*, and 3*c* are plan and sectional views of an object or a portion thereof representing steps in the method of forming a glass film on the surface of that object.

Referring now to FIGS. 2 and 3*a* of the drawing, the object or substrate 17 to receive the glass film is placed in another clean container 10 and is then covered with a first fluid 18 having a dielectric constant less than 9, for example in the range of 2–9. Various halogenated hydrocarbons such as carbon tetrachloride with a dielectric constant K of 2.2, tetrachloroethylene with a K of 2.5, trichloroethylene with a K of 3.4, chloroform with a K of 4.8, bromobenzene with a K of 5.4, or a mixture of 4 parts by volume of trichloroethylene with 1 part of alcohol to produce a K of 9 may be employed as the first fluid 18. A few millimeters such as 1–10 of the first fluid preferably covers the upper surface of the wafer 17.

The step described above represents a departure from the technique explained in applicants' above-mentioned copending application, which technique does not employ a first fluid, such as one of those described in the preceding paragraph, in conjunction with a second fluid that is a colloidal suspension of glass particles.

In accordance with the method of the present invention, the next step in forming a glass film on the surface of the object or wafer 17 comprises covering the first fluid 18 with a second fluid 19 having a dielectric constant in the range of 6–33.6, a density less than that of the first fluid, and containing a suspension of finely divided particles. This second fluid is one of the previously described colloidal suspensions containing the glass particles having an average cross-sectional dimension within the range of 0.02–2 microns. The second fluid 19 is poured over the first fluid 18 so that about 1–4 cms. of the second fluid covers the surface of the denser first fluid.

In general, experience has indicated that the dielectric constant of the first fluid 18 and that of the colloidal suspension selected for the second fluid 19 should vary in opposite senses. Expressed somewhat differently, if a second fluid 19 having a higher dielectric constant is to be employed for a given application, then the first fluid 18 should have a lower dielectric constant. When high dielectric constant materials are to be employed as the second fluid, to assure better results it may sometimes be desirable to handle both the first and second fluids in a particular manner when introducing them into the container 10. A quantity of the first fluid sufficient only to wet the wafer 17 is first poured on that wafer. Then the colloidal suspension or second fluid 19 is poured over the first fluid. The two fluids under consideration must be miscible, in any case, and tend to mix somewhat at the region above the surface of the wafer. Next the tubular outlet of a syringe containing some of the first fluid is inserted below the interface of the two fluids. Additional fluid 18 is squeezed into the container 10 so as to raise the surface of that fluid to the desired level above the surface of the wafer.

After a wafer 17 has been placed in each of two containers 10 and covered with the two fluids 18 and 19 in the manner represented in FIG. 2, the containers are placed in the centrifuge of FIG. 1 and a centrifuging operation is conducted at a speed and for a period of time sufficient to deposit a uniform coating of glass particles on the wafers. The centrifuging is ordinarily conducted for 2–4 minutes at a speed sufficient to develop a centrifugal force of 1000–2500 g. The centrifuging time and speed are not critical. Slow speeds ordinarily require a longer time to deposit the glass particles on the object or wafer. Speeds sufficient to develop centrifugal forces of about 1870–2500 g. have proved to be particularly desirable in depositing particles of glass having the average size under consideration.

During the centrifuging operation, the glass particles in the second fluid 19 migrate through the denser first fluid 18 (which may be slightly modified by mixing during centrifuging) and are deposited as a thin coating 20 (see FIG. 3*b*) of very uniform thickness on the wafer 17. The phenomenon wherein the compact uniform deposit or coating 20 is established on the wafer 17 by centrifuging that wafer is a pair of fluids, one of which includes a fluid suspension of finely divided particles, is a complex one which is not fully understood. It has been established, however, that the dielectric constant of the suspending or second fluid 19 is an important consideration and influences the setting properties of the finely divided glass particles in the suspension. It has been found that with a suspending fluid 19 having a low dielectric constant in the lower portion of the range of 6–33.6, the colloidal particles may tend to form agglomerates in those fluids and that those agglomerates settle out more rapidly. In a subsequent step in the method of the present invention, which step involves separating the wafer 17 from the two fluids in a manner to be explained subsequently, when the wafer thus removed is examined under a high power microscope, it may be found to have an uneven deposit of glass particles thereon where the agglomerates appear as mountains. On the other hand, however, the use of a suspending second fluid 19 with a higher dielectric constant establishes a lesser attraction between the glass particles in the suspension and a consequent reduced tendency for the particles to agglomerate. When the particles are settled on the substrate by centrifuging, a smooth deposit of glass powder is formed but its thickness, in general, is not uniform because during the centrifuging operation there was little attraction between the deposited glass particles and a significant portion thereof slid off the sides of the wafer leaving a smooth but non-uniform deposit thereon. Furthermore, let us assume that the wafer with such a deposit thereon is being removed from the suspension. Although a smooth deposit of glass particles exists on the surface of the wafer, unfortunately there is no strong attraction between those particles. Thus, in the absence of a low dielectric constant first fluid 18 such as trichloroethylene, if the wafer were removed from the colloidal suspension or second fluid as by decanting that fluid, there would be some flowing of the liquid over the surface of the glass deposit and some of the particles would tend to flow with the liquid, especially if the latter is somewhat viscous. This action is termed 'running" and produces an uneven coating of glass particles.

From the foregoing, it will be appreciated that for a smoother deposit of glass on a substrate, it is desirable to employ a suspending medium which has a dielectric constant that is high enough to prevent a significant amount of agglomeration, yet is low enough so that there will be little movement of the deposited glass particles during centrifuging and so that the relative movement of that liquid and substrate during separation after centrifuging will not result in "running" of the glass particles on the substrate. An important advantage of the technique of the present invention. wherein two fluids 18 and 19 having different densities and dielectric constants are employed, resides in the fact that the centrifuging of the glass particles will start the sedimentation without the formation of a significant amount of agglomerates and, after the particles have been deposited on the wafer, they will be in the low dielectric fluid 18 wherein the tendency toward "flowing" or movement of the colloidal glass will be less during centrifuging and on decanting because of the greater attraction between the glass particles.

The usual way to separate the wafer 17 from the fluids 18 and 19 is by decanting the fluids and then removing the wafer from the container 10. If the dielectric constant of the second fluid 19 is high, as when methyl alcohol with a K of 32.6 at 25° C. is employed, the usual decanting operation is ordinarily unsatisfactory. This is because the high dielectric constant material, during decanting, flows over the sedimented particles and undesirably removes some or all thereof. To avoid this, it is desirable to remove the high dielectric second fluid 19 by either of two procedures. In accordance with the first procedure, the second fluid or most of its upper portion is sucked off as with a syringe and then the remainder of the fluid is decanted so that effectively only the first fluid 18 flows over the coated wafer. Pursuant to the second procedure, the container 10 is flooded with a fluid such as trichloroethylene having a low dielectric constant so as to create an overflow which floats off the second fluid 19. Decanting of the first fluid 18 may then be carried out without washing off the sedimented glass particles and damaging the uniformity of the deposit.

Figure 3B:
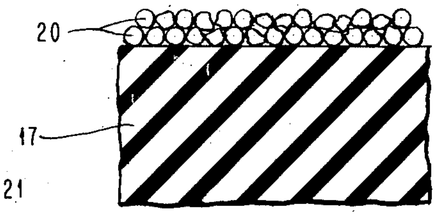

When the structure of FIG. 3*b* is removed from the suspending fluid after the centrifuging operation, it may be air dried to remove any of the fluid remaining on the structure. When volatile fluids such as the organic fluids previously mentioned are employed as the suspending media, their volatility causes any fluid remaining on the structure to evaporate in several seconds. It may be necessary to preheat the structure to drive out less volatile fluids prior to the next or fusing operation, to be described subsequently, in order that bubbles are not created in the resulting fused glass film.

Figure 3C:
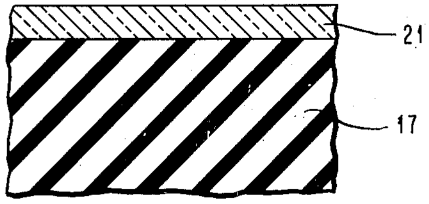

The structure of FIG. 3*b* is introduced for a few minutes into an oven which heats the object or wafer 17 and the glass particles 19 to a temperature which is at least at the softening temperature of those particles. This temperature will vary depending upon the type of glass particles which are employed, 10–80° C. above the softening temperature ordinarily being sufficient. The heating operation fuses the glass particles into a thin uniform hole-free glass film 21 as represented in FIG. 3*c*. Firing times of about 5 minutes have proved to be quite saitsfactory. Higher firing temperatures will permit the use of shorter firing times for the glassing operation. It will be evident, however, that the firing temperature and time should be such that the body 17 is not damaged, particularly where the body may be an electrical component such as a semiconductor device. Since thick glass films are not employed, the method of the present invention uses lower firing temperatures than what would be required to apply the thick jackets of the prior art. This is an advantage in applying impervious glass films to the electrical components which may be damaged by the higher firing temperatures.

The following tabulation lists some of the several types of glasses which have been successfully bonded to various substrates, together with some of the characteristics of the glasses and an identification of their major constituents.

| Glass | Softening Point, ° C. | Approximate Minimum Application Temp., ° C. | Coef. of Exp. per ° C. | Constituents |
|---|---|---|---|---|
| Corning Glasses: | | | | |
| 1826 Aluminosilicate | 585 | 650 | $49\times10^{-7}$ | Major: $SiO_2$, $B_2O_3$. Minor: $Al_2O_3$, PbO. |
| 3320 Hard Sealing Uranium Glass. | 780 | 770 | $40\times10^{-7}$ | |
| 7050 Borosilicate-Series Sealing. | 703 | 760 | $46\times10^{-7}$ | Major: $SiO_2$, $B_2O_3$. |
| 7052 Borosilicate-Kovar Sealing. | 708 | 775 | $46\times10^{-7}$ | Major: $SiO_2$, $B_2O_3$. |
| 7070 Borosilicate-Low Loss Electrical. | 700 | 780 | $32\times10^{-7}$ | Major: $SiO_2$, $B_2O_3$. |
| 7570 Soldering Glass | 440 | 475 | $84\times10^{-7}$ | Major: PbO, $SiO_2$, $B_2O_3$. |
| 7720 Borosilicate (Tungsten Sealing-Nonex). | 755 | 770 | $37\times10^{-7}$ | Major: $SiO_2$, $B_2O_3$. Minor: PbO. |
| 7740 Borosilicate (Pyrex) | 820 | 845 | $32.6\times10^{-7}$ | Major: $SiO_2$, $B_2O_3$. |
| 9741 Borosilicate | 705 | 785 | $39\times10^{-7}$ | Major: $SiO_2$, $B_2O_3$. |
| 8870 High Lead Sealing | 580 | 590 | $91\times10^{-7}$ | Major: $SiO_2$, PbO. Minor: $K_2O$. |
| 8871 Capacitor | 527 | 550 | $103\times10^{-7}$ | |
| 2405 Hard Red | 770 | 810 | $43\times10^{-7}$ | |
| Pemco Corp.: | | | | |
| S1117 | 600 | 625 | $64\times10^{-7}$ | Major: $B_2O_3$, $SiO_2$, ZnO, PbO. |
| PIM 38 | ------ | 820 | ------ | Major: $SiO_2$, $B_2O_3$, 10% ZnO. |
| Drakenfeld: | | | | |
| E1527 | 520 | 570 | $60\times10^{-7}$ | Major: PbO, $SiO_2$, $B_2O_3$. |
| E1598 | 550 | 600 | $46\times10^{-7}$ | Major: PbO, $SiO_2$, $B_2O_3$. |

From the foregoing description and explanation, it will be seen that the method of the present invention is a relatively simple one for providing an improved very thin uniform hole-free glass film on the surface of a substrate. It will also be clear that the techniques of the present invention permit the use of fluids having high dielectric constants as the suspending media for glass particles to be deposited on substrates to be coated with a thin film of glass. Furthermore, a substrate which includes a glass film bonded thereto in accordance with the process of the invention need not have a coefficient of thermal expansion which closely matches that of the glass. Since the sizes of the glass particles are extremely small and because the glass films applied to substrates in accordance with the techniques of this invention are extremely thin, the temperature required to fuse the films to those substrates may be kept relatively low and this, accordingly, reduces the possibility of damaging an electrical device which may constitute that substrate.

While the invention has been particularly shown and described with reference to preferred embodiments thereof, it will be understood by those skilled in the art that foregoing and other changes in form and details may be made therein without departing from the spirit and scope of the invention.

What is claimed is:

1. The method of forming a glass film on the plane surface of an object comprising:
   covering said object with a first fluid having a dielectric constant less than 9;
   covering said first fluid with a second fluid having a dielectric constant in the range of 6–33.6, a density less than that of said first fluid, and containing a suspension of finely divided glass particles;
   centrifuging said object and fluids to deposit said particles on said surface;
   separating said object from said fluids; and
   heating said object to at least the softening temperature of said particles for a time sufficient to fuse said particles and produce a thin uniform hole-free glass film on said surface.

2. The method of forming a glass film on the plane surface of an object comprising:
   covering said object with a first fluid having a dielectric constant in the range of 2–9;
   covering said first fluid with a second fluid having a dielectric constant in the range of 6–33.6, a density less than that of said first fluid, and containing a suspension of finely divided glass particles;
   centrifuging said object and fluids to deposit said particles on said surface;
   separating said object from said fluids; and
   heating said object 10–80° C. above the softening temperature of said particles for a time sufficient to fuse said particles and produce a thin uniform hole-free glass film on said surface.

3. The method of forming a glass film on the plane surface of an object comprising:
   covering said object with a first fluid having a dielectric constant in the range of 2–9;
   establishing a suspension of finely divided glass particles in a second fluid having a dielectric constant in the range of 6–33.6 and a density less than that of said first fluid;
   covering said first fluid with said second fluid;
   centrifuging said object and fluids to deposit said particles on said surface;
   separating said object from said fluids; and
   heating said object above the softening temperature of said particles for a time sufficient to fuse said particles and produce a thin uniform hole-free adherent glass film on said surface.

4. The method of forming a glass film on the plane surface of an object comprising:
   covering said object with a first fluid having a dielectric constant in the range of 2–9;
   establishing a suspension of finely divided glass particles in a second fluid having a dielectric constant in the range of 6–33.6 and a density less than that of said first fluid;
   said particles having a predetermined average cross-sectional dimension within the range of 0.02 to 2 microns;
   centrifuging said object and fluids to deposit said particles on said surface;
   removing said object from said fluids; and
   heating said object above the softening temperature of said particles for a time sufficient to fuse said particles and produce a thin uniform hole-free adherent glass film on said surface.

5. The method of forming a glass film on the plane surface of an object comprising:
   covering said object with a first fluid having a dielectric constant in the range of 2–9;
   establishing a suspension of finely divided glass particles in a second fluid which is miscible in said first fluid and has a dielectric constant in the range of 6–33.6 and a density less than that of said first fluid;

said particles having a mean particle size in the range of 0.1 to 0.7 micron;
covering said first fluid with said second fluid;
centrifuging said object and fluids at a speed sufficient to develop a centrifugal force of from 1870–2500 times the force of gravity to deposit said particles on said surface;
removing said object from said fluids; and
heating said object above the softening temperature of said particles for about 5 minutes to fuse said particles and produce a thin uniform hole-free adherent glass film on said surface.

6. The method of forming a glass film on the plane surface of an object comprising:
covering said object with a halogenated hydrocarbon first fluid having a dielectric constant in the range of 2–9;
establishing a suspension of finely divided glass particles in a second fluid having a dielectric constant in the range of 6–33.6 and a density less than that of said first fluid;
said particles having an average cross-sectional dimension within the range of 0.1 to 0.7 micron;
covering said first fluid with said second fluid;
centrifuging said object and fluids to deposit said particles on said surface;
separating said object from said fluids; and
heating said object above the softening temperature of said particles for a time sufficient to fuse said particles and produce a thin uniform hole-free adherent glass film on said surface.

7. The method of forming a glass film on the plane surface of an object comprising:
covering said object with trichloroethylene;
covering said trichloroethylene with methyl alcohol containing a suspension of finely divided glass particles;
centrifuging said object and fluids to deposit said particles on said surface;
removing the major portion of said methyl alcohol;
removing said object from the remainder of said trichloroethylene and methyl alcohol; and
heating said object above the softening temperature of said particles for a time sufficient to fuse said particles and produce a thin uniform hole-free adherent glass film on said surface.

8. The method of forming a glass film on the plane surface of an object comprising:
covering said object with trichloroethylene;
covering said trichloroethylene with a mixture of 5–20 parts by volume of methyl alcohol and 95–80 parts of ethyl acetate, said mixture containing a suspension of finely divided glass particles;
centrifuging said object and fluids to deposit said particles on said surface;
syphoning off the major portion of said mixture of said alcohol and acetate;
removing said object from the remainder of said fluids; and
heating said object above the softening temperature of said particles for a time sufficient to fuse said particles and produce a thin uniform hole-free adherent glass film on said surface.

9. The method of forming a glass film on the plane surface of an object comprising:
covering said object with a first fluid consisting of a mixture of 4 parts by volume of trichloroethylene and 1 part methyl alcohol having a dielectric constant of about 9;
covering said first fluid with a second fluid having a dielectric constant in the range of 6–33.6, a density less than that of said first fluid, and containing a suspension of finely divided glass particles;
centrifuging said object and fluids to deposit said particles on said surface;
syphoning off the major portion of said mixture;
decanting the remainder of said fluids to separate said object therefrom; and
heating said object above the softening temperature of said particles for a time sufficient to fuse said particles and produce a thin uniform hole-free adherent glass film on said surface.

References Cited by the Examiner

UNITED STATES PATENTS

| | | | |
|---|---|---|---|
| 2,119,309 | 5/38 | Batchelor | 117—101 XR |
| 2,589,169 | 3/52 | Veale | 117—23 |
| 2,793,137 | 5/57 | Friedman | 117—33.5 |
| 2,826,510 | 3/58 | Mayer | 117—33.5 |
| 2,944,916 | 7/60 | Evans | 117—33.5 |

FOREIGN PATENTS

| | | |
|---|---|---|
| 587,741 | 5/47 | Great Britain. |
| 841,845 | 7/60 | Great Britain. |

RICHARD D. NEVIUS, *Primary Examiner.*